United States Patent [19]
Farmer et al.

[11] 3,781,062
[45] Dec. 25, 1973

[54] POSITIVE LATCH FOR MOVABLE BACK OF A SEATING DEVICE

[75] Inventors: David K. Farmer, Niles; Theodore Dlufosinski, Chicago, both of Ill.

[73] Assignee: The Seng Company, Chicago, Ill.

[22] Filed: July 25, 1972

[21] Appl. No.: 274,962

[52] U.S. Cl................................. 297/379, 292/228
[51] Int. Cl............................ A47c 1/10, A47c 7/36
[58] Field of Search................. 5/100, 55 R; 292/87, 292/216, 228 X; 297/379

[56] References Cited
UNITED STATES PATENTS

| | | | |
|---|---|---|---|
| 3,262,725 | 7/1966 | Ballantyne | 292/216 X |
| 3,410,600 | 11/1968 | Thorpe | 297/379 |
| 3,549,202 | 12/1970 | Boschen et al. | 297/379 |

*Primary Examiner*—Casmir A. Nunberg
*Attorney*—Axel A. Hofgren et al.

[57] ABSTRACT

A positive but readily releasable latch means for retaining the backrest of a seating device in an upright position or releasing it to be swung forward about its lower end. The latch means includes a slotted plate mounted adjacent each end of the backrest, a fixed pin on each end of the backrest impaling the slot and freely movable in and out of it, and a combined latch dog and handle pivoted on each plate which is spring urged to a latching position and is manually movable to a release position in which the spring has moved over center to retain the latch dog in that position. The structure of the latch dog and handle are such that the latch dog can never fail to latch and can never block entry of the latch pins into the slots. The latch is particularly designed for convertible settee-beds of recreational vehicles, which must meet Federal Highway Safety specifications.

6 Claims, 5 Drawing Figures

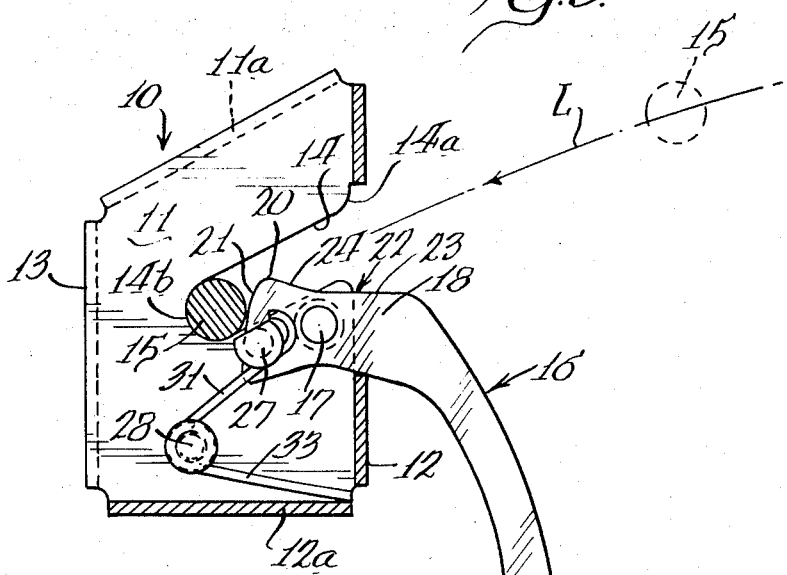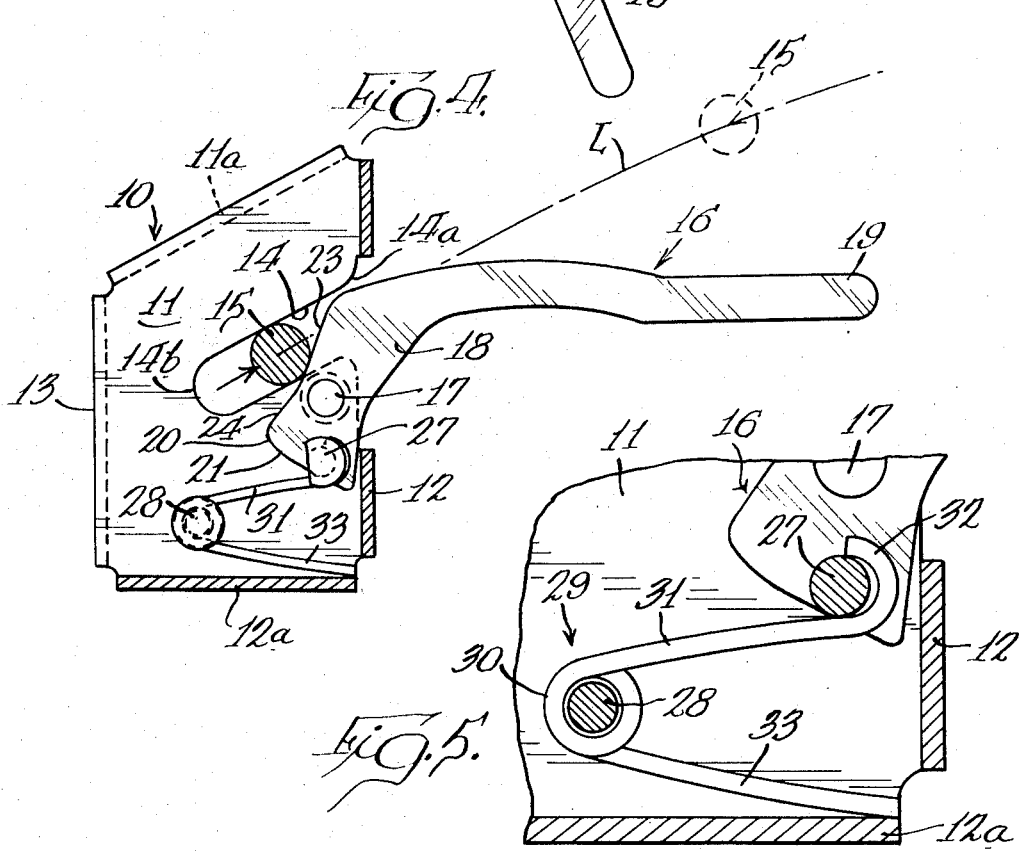

POSITIVE LATCH FOR MOVABLE BACK OF A SEATING DEVICE

BACKGROUND OF THE INVENTION

Convertible furniture which has a movable backrest, and particularly a backrest that may swing forwardly about its lower end from an upright position, require a positive but readily releasable latch to retain them in upright position, especially if they are to be used in a recreational vehicle such as a motor home which must meet Federal Highway Safety specifications.

Most latches heretofore available for use in latching a backrest in an upright position adjacent a fixed frame member such as the wall of a motor home have either lacked positive locking capability, or if they had that they were not readily manually releasable, or in some instances they would not always latch positively or would block a latch pin from entering the latch plate. All such characteristics are undesirable for a manually operated latch, and may be fatal to their acceptance for use with convertible furniture in recreational vehicles.

SUMMARY OF THE INVENTION

The principal object of the present invention is to provide a readily manually releasable latch which nevertheless positively latches a movable backrest in its upright position while nevertheless permitting the backrest to be easily swung forward about its lower end either for conversion to a bed or for giving access to storage space behind it.

Another object of the invention is to provide a latch which may be used in recreational vehicles and meets all Federal Highway Safety specifications.

Yet another object of the invention is to provide a positive latch mechanism which cannot fail to latch when a movable backrest is returned to its usual upright position.

Yet another object of the invention is to provide a latch in which a latch dog that positively latches a pin on a backrest to a latch plate can under no circumstances block entry of the latch pin into the latch plate as the backrest is returned to its upright position.

Still another object of the invention is to provide a latch structure which has two separate latch elements at opposite ends of a backrest which may be manually moved individually from a latching position to a release position and which will remain in the release position in a recreational vehicle which is parked; but which will be shaken out of release position and returned to latching position by vehicle body vibration if the vehicle is in motion, so that one person can move the backrest from its upright position only when the vehicle is parked and not when it is in motion.

THE DRAWINGS

FIG. 3 is a fragmentary sectional view taken substantially as indicated along the line 3—3 of FIG. 2 illustrating the latch mechanism in latching position, and with a broken line illustrating the path of movement of a latch pin on the backrest as it moves toward and into the latch mechanism;

FIG. 4 is a view like FIG. 3 with the latch dog and operating handle in release position, a latch pin on the backrest being illustrated early in its movement out of the latch slot, and path of movement of the pin toward the slot being illustrated in broken lines; and FIG. 5 is a greatly enlarged view of the latch spring and spring pin in the position of FIG. 4 with the heads of the spring pins removed for clarity of illustration.

DETAILED DESCRIPTION OF THE INVENTION

Figure 1:
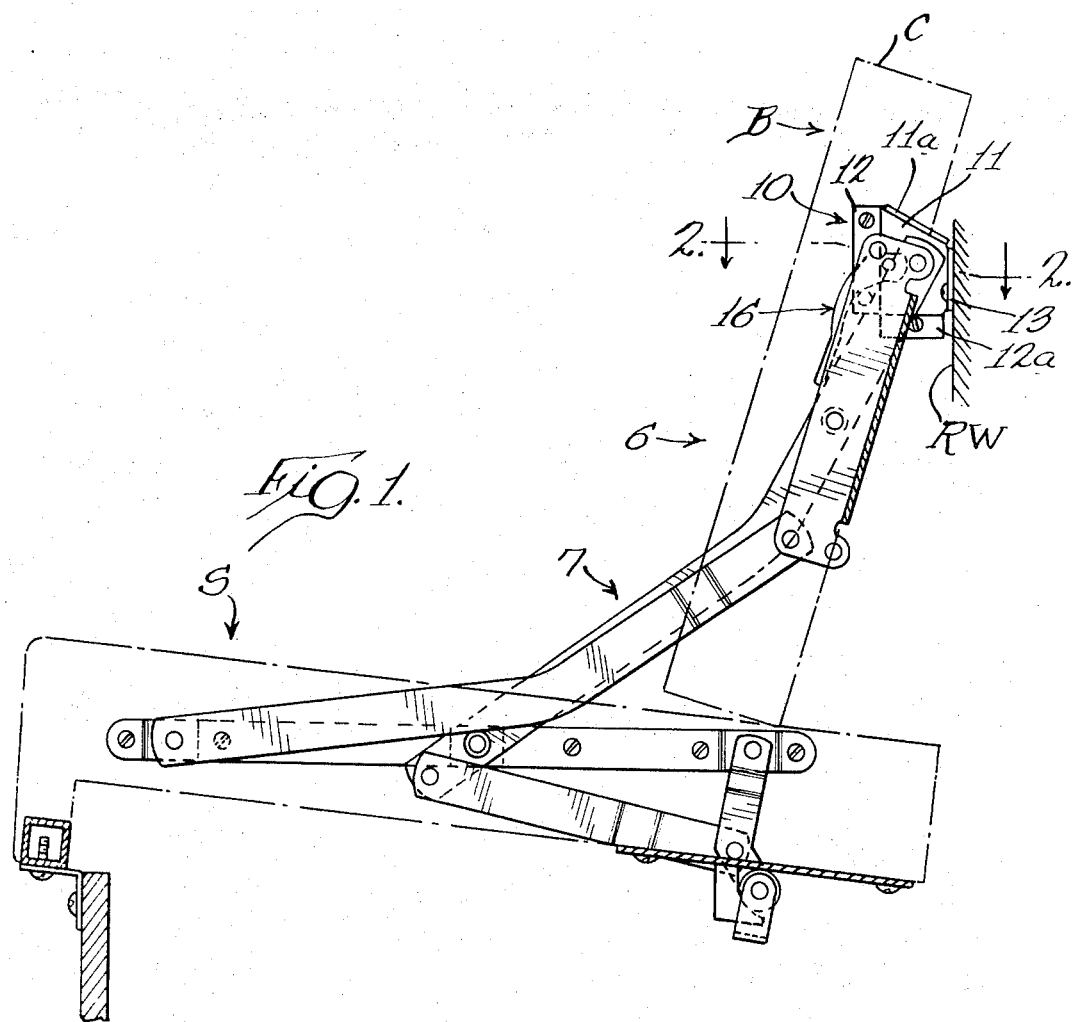
FIG. 1 is a side elevational view, partly in section, of an operating linkage for a convertible settee-bed which is particularly designed for use in recreational vehicles, with the latch mechanism of the present invention incorporated therein.

Referring to the drawings in detail, and referring first to FIG. 1, a convertible settee-bed unit, indicated generally at 6, includes a linkage system, indicated generally at 7, by means of which a backrest, indicated generally at B, may be swung about its lower end from the generally upright illustrated position to a position forward of a seat S where the back cushion which is illustrated in broken lines and the seat cushion which is illustrated in broken lines cooperate to form a bed. The linkage 7 is described in detail and claimed in copending application of Ned W. Mizelle, Ser. No. 241,530, filed Apr. 6, 1972, and assigned to the assignee of the present application.

For purposes of the present disclosure, it is sufficient to note that the backrest B is swung on the linkage 7 from the illustrated generally upright settee position to a position in front of the seat with its cushion C, which is indicated in broken lines, uppermost. At the same time, the rear of the seat is elevated to place the seat in a horizontal bed position. Movement of the backrest B in and out of its illustrated upright position is substantially along the broken line L illustrated in FIGS. 3 and 4. The linkage 7 includes a backrest bracket 8, and a pivotal connection 9 for a link of the linkage is extended laterally as seen in FIG. 2 to provide a fixed latch pin 15, the function of which will be described in detail hereafter.

Figure 2:
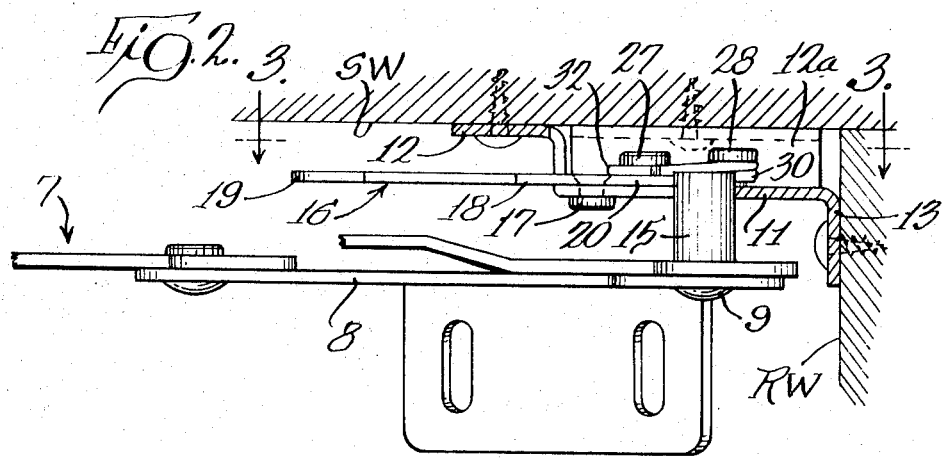
FIG. 2 is a fragmentary sectional view on an enlarged scale taken substantially as indicated along the line 2—2 of FIG. 1.

Referring now to FIGS. 2 to 4, the latch means of the present invention includes a latch frame, indicated generally at 10, which has a face plate 11, offset mounting flanges 12 and 12a which are positioned, respectively, at the front and at the bottom of the face plate 11 and which are fastened to the sidewall SW by means of screws, and a mounting flange 13 which is fastened to the rear wall RW by means of screws. The upper end of the face plate 11 is bent at a 90° angle to provide a guard flange 11a so that a person who is moving the backrest B to the upright position cannot inadvertently get a finger into the path of the pin 15. Finally, the face plate is provided with an inclined slot 14 having an open front end 14a and a closed rear end 14b. The longitudinal center line of the slot 14 coincides with the line of movement L of the center line of the latch pin 15 so that said pin may move freely in and out of the slot as the backrest B is moved to and from the upright position of FIG. 1.

The latch means also includes a combined latch dog and manual operating handle, indicated generally at 16, which is pivotally mounted on the face plate 11 on a pivot 17. The combined latch dog and handle includes a latch dog 18 and a handle 19 which are so constructed that, as is apparent from the drawings and as will be described in detail, the dog-handle 16 is movable between a latching position illustrated in FIG. 3 and a release position illustrated in FIG. 4. In the latching position, the latch dog 18 positively latches the latch pin 15 in the rear end 14b of the slot 14, and regardless of whether the latch dog-handle 16 is in the position of FIG. 3 or the position of FIG. 4, it cannot obstruct entry of the latch pin 15 into the slot 14. Neither can it fail to positively latch the latch pin 15 in the position to FIG. 3 when the backrest is returned to the upright position of FIG. 1.

In order to accomplish the foregoing, the latch dog 18 includes a shoulder 20 that projects into the path of movement of the latch pin and has a rear face 21 which positively blocks forward movement of the latch pin 15 when the latch dog 18 is in the latching position of FIG. 3; but which is below the path of movement of the latch pin when the latch dog is in the release position of FIG. 4. The upper portion of the rear face 21 is curved forwardly on an arc of a circle about the center of the pivot pin 17 so that free movement of the latch dog between the positions of FIG. 3 and FIG. 4 is not obstructed by impingement upon the latch pin 15.

In addition to the rear face 21, the shoulder 20 has a forward double cam face, indicated generally at 22, which includes a first cam surface 23 that is seen in FIG. 4 to extend diagonally across the path of forward movement of the pin 15 when the latch dog 18 is in release position so that during its movement out of the slot 14, the pin 15 contacts the first cam surface 23 to return the latch dog 18 to the latching position. The double cam face 22 also has a second cam surface 24 which is seen in FIG. 3 to extend diagonally across the path of rearward movement of the latch pin 15 so that movement of the pin into the slot pivots the latch dog from latching position and permits the pin to seat in the rear 14b of the slot behind the rear face 21 of the shoulder.

Finally, the handle 19 includes a handle cam surface 25 which, in the release position of FIG. 4, is in the path of rearward movement of the latch pin 15. Thus, if somebody has moved the latch dog-handle 16 to the release position while the backrest B is in bed position, the latch pin 15 cannot be blocked out of the slot 14 because it strikes the cam surface 25 which causes the latch dog-handle to return to the latching position of FIG. 3.

The latch structure also includes spring means, indicated generally at 26, that includes a first spring pin 27 on the latch dog, a second spring pin 28 on the face plate, and a hairpin type spring indicated generally at 29. As best seen in FIG. 5, the spring 29 has a bight portion 30 which loosely encircles the spring pin 28, a first spring arm 31 at the free end of which is a hook 32 that hooks forward of the first spring pin 27, and a second spring arm 33 which bears upon the horizontal portion of the offset flange 12a.

In moving from the latching position of FIG. 3 to the release position of FIG. 4, the spring 29 moves very slightly over a dead center position so that the spring, which normally biases the latch dog-handle 16 firmly to the position of FIG. 3, may also bias it very slightly to the position of FIG. 4. The release position of the latch dog-handle 16 is very unstable, so that although a person may move the latch dog-handle to the release position and it will stay there, even moderate vibration can overcome the bias of the spring and cause the latch dog-handle to return to its latching position. Furthermore, if the latch dog-handle is moved rapidly from the latching position to the release position, it will fail to remain in that position for the reason hereinafter described.

Comparison of FIGS. 3, 4 and 5 shows that the first spring pin 27 traverses the first spring arm 31 as it moves between the latching position of FIG. 3 and the release position of FIG. 4, and that in the release position said first spring is very slightly short of seating in the hook 32. This permits the latch dog-handle 16 to slightly override the release position of FIG. 4 and seat in the spring hook 32 which slightly stresses the spring 29 and pulls the bight portion 30 against the second spring pin 28. This stressing of the spring is sufficient to drive the latch dog-handle 16 back through the release position of FIG. 4 to the latching position of FIG. 3.

The position of the second cam surface 24 with respect to the pivot pin 17, and the angle of the second cam face 24 with respect to the slot 14, are such that when the latch pin strikes the second cam surface 24 there is a very high mechanical advantage to help swing the latch dog-handle 16 from its latching position. The force exerted by the pin 15 is sufficient that, unless the backrest is returned to its upright position very slowly, the latch dog-handle 16 is swung rapidly from the latching position of FIG. 3 to and through the release position of FIG. 4, so that the first spring 27 seats in the hook 32 and stresses the spring 29 which causes the latch dog-handle 16 to bounce through the release position of FIG. 4 and return to the latching position of FIG. 3. As a result, it makes no difference whether the backrest B is returned to its upright position very gently or with considerable force, it is impossible for the latch dog-handle 16 to be in any position but its latching position by the time the latch pin 15 seats in the rear end 14b of the slot 14.

There is a latch means at each end of the backrest B of a convertible settee-bed, and a person must move the latch dog-handle 16 from the latching position to the release position one at a time and then grasp the backrest to swing it forward. Reference has previously been made to the instability of the release position of the latch dog-handle, which is such that vibration prevents it from remaining in its release position. This is significant in a settee-bed used in a motor home or other recreational vehicle, because it is considered hazardous to attempt to convert a unit from settee to bed while the vehicle is in motion, and the instability of the release position of the latch means makes it impossible for one person to do this alone.

The foregoing detailed description makes it apparent that the latch means of the present invention positively locks the backrest of a settee-bed in its upright settee position, cannot malfunction so as to fail to lock the backrest in its upright position, and can be made strong enough to meet the very high impact tests established by the U. S. Government Highway Safety specifications. Accordingly, it meets all requirements for use in motor homes and other recreational vehicles, and has the added advantage that it prevents one person from converting a settee-bed while a vehicle is in motion.

The foregoing detailed description is given for clearness of understanding only and no unnecessary limitations should be understood therefrom, as modifications will be obvious to those skilled in the art.

We claim:

1. In a seating device having a backrest which has a generally upright position adjacent a fixed frame member and which may be swung forwardly about its lower side from said upright position, readily manually releasable positive latch means for retaining the backrest in said position, said latch means comprising, in combination:

a latch frame mounted on the fixed frame member where it is alongside an end and a substantial distance above the lower side of the backrest in upright position of the latter, said latch frame having mounting flange means and a face plate that is parallel to the plane of movement of the end of the backrest, said face plate having a slot that is open toward the front and closed at the rear;

a fixed latch pin on the end of the backrest, said pin impaling the face plate slot and seating against the closed rear of the slot in upright position of the backrest, and said pin, when unobstructed, moving freely in and out of the slot upon movement of the backrest;

a latch dog pivotally mounted on the face plate adjacent the slot for movement between a latching position and a release position, said latch dog having a shoulder that projects into the path of movement of the latch pin, the shoulder having a rear face which positively blocks forward movement of the latch pin in latching position of the latch dog and is clear of the path of movement of the pin in release position, and said shoulder having a forward double cam face, said double cam face having a first cam surface which extends diagonally across the path of forward movement of the pin in release position of the latch dog so that movement of the pin out of the slot returns the latch dog to latching position, and said double cam face having a second cam surface which extends diagonally across the path of rearward movement of the pin in latching position of the latch dog so that movement of the pin into the slot pivots the latch dog from latching position and permits the pin to seat in the rear of the slot behind the rear face of the shoulder;

a first spring pin on the latch dog, a second spring pin on the face plate, and a spring anchored on said pins, said spring normally biasing the latch dog toward latching position and moving over center as the latch dog nears release position to retain said dog in said position;

and an integral, forwardly extending manual operating handle on the latch dog, said handle having a handle cam surface which is forward of the slot and in the path of rearward movement of the latch pin when the latch dog is in release position, so the latch pin returns the latch dog to latching position as it approaches the slot with the latch dog in said release position.

2. The combination of claim 1 in which the weight and balance of the latch dog and handle are so related to the tension of the spring and to the release position of the latch dog relative to the dead-center position of the spring that if the latch pin moving into the slot strikes the second cam surface with sufficient force to move the latch dog to release position, the latch dog and handle overrun the release position and bounce back past dead center to latching position.

3. The combination of claim 1 in which the latch dog in release position is sufficiently unstable that the normal vibration of a motor home in motion on a highway shakes the latch dog past dead-center and it returns to latching position.

4. The combination of claim 1 in which the spring is a hairpin type with its bight encircling the second spring pin, a first spring arm bearing on the first spring pin, said first arm having a hook at its free end which loops behind said first spring pin to stop movement of the latch dog slightly past release position, and a second spring arm bearing against a mounting flange.

5. The combination of claim 4 in which the first spring pin traverses the first spring arm as the latch dog moves between latching and release positions, said first spring pin in release position of the latch dog being slightly short of the hook on said first spring arm, and the seating of said first spring pin in said hook stressing said spring sufficiently to force the latch dog back past dead center and to latching position.

6. The combination of claim 1 in which the position of the second cam surface with respect to the pivotal mounting of the latch dog is such that if the backrest is returned rapidly to upright position the contact of the latch pin with said second cam surface causes the latch dog to overrun the release position and bounce back to latching position.

* * * * *